United States Patent
Yan et al.

(10) Patent No.: US 9,974,007 B2
(45) Date of Patent: May 15, 2018

(54) METHOD AND APPARATUS FOR MANAGING ACCESS NETWORK INFORMATION

(71) Applicant: ZTE Corporation, Shenzhen (CN)

(72) Inventors: Wei Yan, Shenzhen (CN); Min Shen, Shenzhen (CN); Na Zhou, Shenzhen (CN); Yuzhen Huo, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days. days.

(21) Appl. No.: 15/030,257

(22) PCT Filed: Apr. 25, 2014

(86) PCT No.: PCT/CN2014/076263
§ 371 (c)(1),
(2) Date: Apr. 18, 2016

(87) PCT Pub. No.: WO2015/054999
PCT Pub. Date: Apr. 23, 2015

(65) Prior Publication Data
US 2016/0255571 A1   Sep. 1, 2016

(30) Foreign Application Priority Data

Oct. 18, 2013 (CN) .......................... 2013 1 0493782

(51) Int. Cl.
*H04W 48/16* (2009.01)
*H04W 12/06* (2009.01)
(Continued)

(52) U.S. Cl.
CPC ........... *H04W 48/16* (2013.01); *H04W 12/06* (2013.01); *H04W 48/14* (2013.01); *H04W 48/12* (2013.01); *Y02B 60/50* (2013.01)

(58) Field of Classification Search
CPC ..... H04W 48/16; H04W 48/14; H04W 12/06; H04W 48/12; Y02B 60/50
See application file for complete search history.

(56) References Cited

U.S. PATENT DOCUMENTS

| | | | |
|---|---|---|---|
| 2009/0109927 A1* | 4/2009 | Suh ........................ | H04W 48/08 370/331 |
| 2010/0003980 A1* | 1/2010 | Rune ..................... | H04W 48/16 455/436 |

(Continued)

FOREIGN PATENT DOCUMENTS

| | | |
|---|---|---|
| CN | 101730067 A | 6/2010 |
| CN | 102752833 A | 10/2012 |

(Continued)

OTHER PUBLICATIONS

International Search Report for corresponding application No. PCT/CN2014/076263 filed on Apr. 25, 2014; dated Jul. 21, 2014.

(Continued)

*Primary Examiner* — Kamran Afshar
*Assistant Examiner* — Minjung Kim
(74) *Attorney, Agent, or Firm* — Cantor Colburn LLP

(57) ABSTRACT

A method and apparatus for managing access network information are provided. The method includes: the dynamic access network information is obtained, and the current access network information list can be updated in real time according to the obtained dynamic access network information, so as to ensure that access network information obtained by a user terminal from the access network information list is latest information updated in real time. Thus, after the user terminal obtains the information, a process of scanning an access network to determine current availability information of the network can be omitted, so that the switching delay can be reduced, the switching efficiency can (Continued)

be improved, and the power consumption of the user terminal can be reduced, thereby improving the satisfaction degree of user experience.

9 Claims, 4 Drawing Sheets

(51) Int. Cl.
*H04W 48/14* (2009.01)
*H04W 48/12* (2009.01)

(56) References Cited

U.S. PATENT DOCUMENTS

| | | | | |
|---|---|---|---|---|
| 2012/0178488 A1* | 7/2012 | Jonker | ................ | H04W 8/005 455/517 |
| 2012/0196644 A1 | 8/2012 | Scherzer | | |
| 2012/0204243 A1* | 8/2012 | Wynn | ................ | H04L 63/08 726/5 |
| 2013/0019298 A1* | 1/2013 | Jover Segura | ........ | H04L 63/101 726/7 |
| 2013/0182697 A1* | 7/2013 | Tuominen | ............. | G01S 5/0242 370/338 |
| 2013/0303164 A1* | 11/2013 | Seo | ................ | H04W 76/027 455/435.1 |
| 2014/0119218 A1* | 5/2014 | Hsu | ................ | H04L 12/1435 370/252 |
| 2014/0233374 A1* | 8/2014 | Elliott | ................ | H04W 48/16 370/228 |
| 2016/0174141 A1* | 6/2016 | Poulsen | ................ | H04W 48/16 370/328 |

FOREIGN PATENT DOCUMENTS

| | | |
|---|---|---|
| EP | 2056633 A2 | 5/2009 |
| WO | 2010148791 A1 | 12/2010 |
| WO | 2013134669 A1 | 9/2013 |

OTHER PUBLICATIONS

European Search Report for corresponding application EP14853617; Report dated Oct. 17, 2016.

* cited by examiner

METHOD AND APPARATUS FOR MANAGING ACCESS NETWORK INFORMATION

TECHNICAL FIELD

The present invention relates to the field of communications, and in particular to a method and apparatus for managing access network information.

BACKGROUND

The Wireless Local Area Network (WLAN) and the cellular mobile communication network (cellular network for short) are two wireless communication technologies widely applied to the world at present. The WLAN mainly aims at a personal consumption electronics market and a broadband wireless access market for families and enterprises. The cellular network mainly aims to a telecom operator market and provides mobile communication service for the public. As intelligent mobiles are popularized on a large scale and the mobile internet is quickly developed, users need a wireless access network with high transmission speed more intensely. A $4^{th}$ Generation (4G) network represented by a Long Term Evolution (LTE) technology is being gradually constructed and deployed. Compared with wide coverage of a $3^{rd}$ Generation Partnership Project (3GPP) cellular mobile network, the WLAN places more emphasis on provision of low-mobility data services for mobile phones and the mobile internet in hot-spot regions.

In order to reasonably utilize network side resources and guarantee the service experience of the users, it is particularly important to select an appropriate access network. More terminals have an ability to access more access networks at the same time due to the popularisation and development of the intelligent terminals. How to select the most appropriate access network at appropriate time and at an appropriate place by the users so as to obtain an optimal network application experience is a problem on which an operator needs to focus. A 3GPP proposes a network selection mechanism based on Access Network Discovery Support Functions (ANDSF) is capable of selecting an access network according to factors such as a geographic position of a user, a load state of the access network and a selection preference of the user, providing an optimal network selection policy for a terminal, balancing the load state of the network, guaranteeing the quality of services, and improving the user experience.

In an Evolved Packet System (EPS) and an access network framework proposed by the existing 3GPP, the EPS supports intercommunication with a non-3GPP system, which is realized via S2a/b interfaces. An anchor point between a 3GPP system and the non-3GPP system is a Packet Data Network Gateway (PDN GW). The non-3GPP system can be divided into trusty non-3GPP Internet Protocol (IP) access and trustless non-3GPP IP access. The trusty non-3GPP IP access can be directly connected with the PDN GW via an S2a interface. The trustless non-3GPP IP access needs to be connected with the PDN GW via an Evolved Packet Data Gateway (ePDG), and an interface between the ePDG and the PDN GW is an S2b interface. User Equipment (UE) interacts with the ANDSF via an S14 interface. The S14 interface supports both a PULL mechanism (UE requesting) and a PUSH mechanism (network triggering), and is implemented over an IP layer. The ANDSF includes a data management and control function, and information including an intersystem mobility policy, access network discovery information and an intersystem routing policy can be provided as follows.

1) The intersystem mobility policy refers to a group of rules and preferences defined by the operator, and can influence an intersystem mobility decision. The UE decides whether intersystem mobility is intended to allow or limit and select a more preferred access network by using the intersystem mobility policy. The intersystem mobility policy should be provided for a mobile terminal based on user requesting or network triggering, and can be updated by the ANDSF. An access technology marked by the intersystem mobility policy or a specific access network having higher priority can be limited or allowed.

2) When the UE requests for network selection, the ANDSF can provide a group of effective access network lists surrounding the UE, the list including various pieces of access network technology information. The effective access technology information includes an access technology type (such as the WLAN and Worldwide Interoperability for Microwave Access (WiMAX)) and a wireless access network identifier (such as a Service Set Identifier (SSID) of the WLAN). In addition, there is also specific information of other technologies such as one or more carrier frequencies, and restraint conditions such as some conditions mark a moment at which provided access network information is effective. The UE should retain and use these pieces of access network information provided by the ANDSF until next updating information is received.

3) When the UE routes an IP service by simultaneously using a plurality of wireless interfaces, the ANDSF probably provides an intersystem routing policy list to the UE, and the UE can route the IP service via the interfaces simultaneously. The UE uses this policy to realize operator routing/offload priority, and decides when an access technology is limited to a specific IP service stream; and a specific principle is matched with the routed IP service, and the most appropriate access technology is selected. The intersystem mobility policy should be provided for the mobile terminal based on user requesting or network triggering, and can be updated by the ANDSF at the same time.

Only static information is defined by the ANDSF in a current standard. Since access network information in an access network information list stored in an ANDSF database cannot be dynamically updated, under some conditions that a certain access point is closed due to a fault or is no longer suitable for access of a new user due to over-large number of current users and over-high load, the information of these access points is invalid information. In order to avoid the conditions, after a user terminal obtains the access network information, it is necessary to scan the access network so as to determine current availability information of the network, thereby improving the switching delay, reducing the switching efficiency, and improving the power consumption of the user terminal.

SUMMARY

The embodiments of the present invention provide a method and apparatus for managing access network information, which are intended to solve the main technical problems of long switching time and low efficiency needed by a user terminal during switching according to access network information due to the fact that the access network information cannot be dynamically updated at present.

In order to solve the technical problems, the embodiments of the present invention provide a method for managing access network information, which may include that:

the dynamic access network information is obtained; and the current access network information list is updated according to the obtained dynamic access network information.

In an embodiment of the present invention, the step that the dynamic access network information is obtained may include that: the dynamic access network information is obtained from a user terminal, and/or the dynamic access network information is obtained from an access network management module.

In an embodiment of the present invention, when obtaining of the dynamic access network information includes obtaining of the dynamic access network information from the user terminal, the method may include that:

the dynamic access network information, sent by the user terminal, is received, the dynamic access network information being dynamic access network information generated by the user terminal according to a connection result of connection thereof to an access network; and the user terminal access the access network according to access network information obtained by sending an access network information obtaining request containing current position information or according to access network information obtained by self-detection.

In an embodiment of the present invention, the dynamic access network information generated by the user terminal according to the connection result of connection thereof to the access network may include:

when the connection result is that current access network information is successfully connected to a corresponding access point and can be successfully connected to the internet, the generated dynamic access network information includes connection success information, user terminal position information and access point information; or when the connection result is that the current access network information cannot find the corresponding access point or cannot access the corresponding access point or cannot be successfully connected to the internet after being connected to the corresponding access point, the generated dynamic access network information includes connection failure information and access point information, and the connection failure information includes the connection failure reason.

In an embodiment of the present invention, the step that the current access network information list is updated according to the obtained dynamic access network information may include that:

when it is determined that the user terminal is successfully connected according to the obtained dynamic access network information, it is judged whether corresponding access point information exists in the current access network information list, and if NO, the access point information is added to the access network information list; and when it is determined that the user terminal is unsuccessfully connected according to the obtained dynamic access network information, it is judged whether the corresponding access point information exists in the current access network information list, and if YES, the access point is updated according to the connection failure reason of the user terminal.

In an embodiment of the present invention, the step that the access point is updated according to the connection failure reason of the user terminal may include that:

an access network information authentication request containing the access point information and position information of the user terminal is sent to the access network management module;

an authentication result obtained by authentication via the access network management module according to the access network information authentication request is received, the authentication result including the connection failure reason obtained by authentication; it is judged whether the connection failure reason obtained by authentication conforms to a feedback sending failure reason of the user terminal according to the authentication result, and if YES, the access point is updated;

or, the access point is updated after the dynamic access network information, including the same failure reason, fed back by at least one of other user terminals is received.

In an embodiment of the present invention, the step that the access point is updated may include that:

when the failure reason is that the corresponding access point cannot be found or it cannot access the corresponding access point, the access point is set to be unavailable;

when the failure reason is that it cannot be successfully connected to the internet after being connected to the corresponding access point, the priority of the access point is re-set;

or the availability of the access point is calculated by using a pre-set optimization algorithm, when the calculated availability is smaller than a pre-set threshold value, the access point is set to be unavailable, and when the calculated availability is greater than the pre-set threshold value, the access point is set to be available.

In an embodiment of the present invention, when obtaining of the dynamic access network information includes obtaining of the dynamic access network information from the access network management module, the dynamic access network information may include corresponding access point information and access point change information, the access point change information including at least one of position change information, identification change information, unavailable identification information and priority change information.

In an embodiment of the present invention, the step that the current access network information list is updated according to the obtained dynamic access network information may include that:

it is judged whether corresponding access point information exists in the current access network information list according to the obtained dynamic access network information, in the case of existence, if the access point information includes the position change information of the access point, position information of the corresponding access point in the access network information list is updated;

if the access point information includes the identification change information of the access point, identification information of the corresponding access point in the access network information list is updated;

if the access point information includes the unavailable identification information, the corresponding access point in the access network information list is set to be unavailable;

if the access point information includes the priority change information, the priority of the corresponding access point in the access network information list is updated;

and in the case of inexistence, if the access point information includes the unavailable identification information, the corresponding access point is added to the access network information list, the unavailability thereof is recorded, or any processing is not carried out; if the access point information includes the position change information of the access point, the corresponding access point is added to the access network information list, and latest position information thereof is recorded;

if the access point information includes the identification change information of the access point, the corresponding access point is added to the access network information list, and latest identification information thereof is recorded; and if the access point information includes the priority change information, the corresponding access point is added to the access network information list, and latest priority thereof is recorded.

In an embodiment of the present invention, after the current access network information list is updated according to the obtained dynamic access network information, the method may further include that:

the updated access network information is sent to the user terminal according to the access network information obtaining request of the user terminal; or the updated access network information is actively sent to the corresponding user terminal.

In order to solve the problems, the embodiments of the present invention also provide an apparatus for managing access network information, which may include:

an information obtaining module, configured to obtain dynamic access network information; and an information management module, configured to update a current access network information list according to the obtained dynamic access network information.

In an embodiment of the present invention, the process that the information obtaining module obtains the dynamic access network information may include that: the dynamic access network information is obtained from a user terminal, and/or the dynamic access network information is obtained from an access network management module.

In an embodiment of the present invention, when the information obtaining module obtains the dynamic access network information from the user terminal, the information obtaining module receives the dynamic access network information sent by the user terminal;

the dynamic access network information is dynamic access network information generated by the user terminal according to a connection result of connection thereof to an access network; and the user terminal access the access network according to access network information obtained by sending an access network information obtaining request containing current position information or according to access network information obtained by self-detection. In an embodiment of the present invention, the process that the information management module updates the current access network information list according to the obtained dynamic access network information may include that:

when the information management module determines that the user terminal is successfully connected according to the obtained dynamic access network information, it is judged whether corresponding access point information exists in the current access network information list, and if NO, the access point information is added to the access network information list; and when the information management module determines that the user terminal is unsuccessfully connected according to the obtained dynamic access network information, it is judged whether the corresponding access point information exists in the current access network information list, and if YES, the access point is updated according to the connection failure reason of the user terminal.

In an embodiment of the present invention, the process that the information management module updates the access point according to the connection failure reason of the user terminal may include that:

the information management module sends an access network information authentication request containing the access point information and position information of the user terminal to the access network management module;

the information management module receives an authentication result obtained by authentication via the access network management module according to the access network information authentication request, the authentication result including the connection failure reason obtained by authentication; it is judged whether the connection failure reason obtained by authentication conforms to the failure reason fed back by the user terminal according to the authentication result, and if YES, the access point is updated;

or, the information management module updates the access point after the dynamic access network information, including the same failure reason, fed back by at least one of other user terminals is received.

In an embodiment of the present invention, the process that the information management module updates the access point may include that:

when the failure reason is that the corresponding access point cannot be found or it cannot access the corresponding access point, the information management module sets the access point to be unavailable; when the failure reason is that it cannot be successfully connected to the internet after being connected to the corresponding access point, the information management module re-sets the priority of the access point, or when the access point is unavailable currently, the information management module sets the access point to be available;

or, the information management module calculates the availability of the access point by using a pre-set optimization algorithm, sets the access point to be unavailable when the calculated availability is smaller than a pre-set threshold value, and sets the access point to be available when the calculated availability is greater than the pre-set threshold value.

In an embodiment of the present invention, when the information obtaining module obtains the dynamic access network information from the access network management module, the dynamic access network information may include corresponding access point information and access point change information, the access point change information includes at least one of position change information, identification change information, unavailable identification information and priority change information.

In an embodiment of the present invention, the process that the information management module updates the current access network information list according to the obtained dynamic access network information may include that:

the information management module judges whether corresponding access point information exists in the current access network information list according to the obtained dynamic access network information, in the case of existence, if the access point information includes the position change information of the access point, position information of the corresponding access point in the access network information list is updated;

if the access point information includes the identification change information of the access point, identification information of the corresponding access point in the access network information list is updated;

if the access point information includes the unavailable identification information, the corresponding access point in the access network information list is set to be unavailable;

if the access point information includes the priority change information, the priority of the corresponding access point in the access network information list is updated;

and in the case of inexistence, if the access point information includes the unavailable identification information, the corresponding access point is added to the access network information list, the unavailability thereof is recorded, or any processing is not carried out; if the access point information includes the position change information of the access point, the corresponding access point is added to the access network information list, and latest position information thereof is recorded;

if the access point information includes the identification change information of the access point, the corresponding access point is added to the access network information list, and latest identification information thereof is recorded; and if the access point information includes the priority change information, the corresponding access point is added to the access network information list, and latest priority thereof is recorded.

In order to solve the problems, the embodiments of the present invention also provide a user terminal, which may include an obtaining module, a processing module and a sending module, wherein the obtaining module is configured to obtain access network information by sending an access network information obtaining request containing current position information of the user terminal or obtain access network information by self-detection;

the processing module is configured to perform connection processing on an access network according to the access network information and generate dynamic access network information according to a connection result; and the sending module is configured to send the dynamic access network information.

In an embodiment of the present invention, the dynamic access network information generated by the processing module according to the connection result may include:

when the connection result is that current access network information is successfully connected to a corresponding access point and can be successfully connected to the internet, the generated dynamic access network information includes connection success information, user terminal position information and access point information; or when the connection result is that the current access network information cannot find the corresponding access point or cannot access the corresponding access point or cannot be successfully connected to the internet after being connected to the corresponding access point, the generated dynamic access network information includes connection failure information and access point information, and the connection failure information includes a connection failure reason.

The embodiments of the present invention have the beneficial effects as follows.

According to the method and apparatus for managing access network information provided by the embodiments of the present invention, the dynamic access network information is obtained, and the current access network information list can be updated in real time according to the obtained dynamic access network information, so as to ensure that the access network information obtained by the user terminal from the access network information list is latest information updated in real time. Thus, after the user terminal obtains the information, a process of scanning the access network to determine the current availability information of the network can be omitted, so that the switching delay can be reduced, the switching efficiency can be improved, and the power consumption of the user terminal can be reduced, thereby improving the satisfaction of user experience.

DETAILED DESCRIPTION OF THE EMBODIMENTS

According to a method and apparatus for managing access network information provided by the embodiments of the present invention, dynamic access network information is obtained, and a current access network information list can be updated in real time according to the obtained dynamic access network information, so as to ensure that the access network information obtained by a user terminal from the access network information list is latest information updated in real time. Thus, when the user terminal accesses according to the information, a process of scanning an access network to determine current availability information of the network is no longer needed, so that the switching delay can be reduced, the switching efficiency can be improved, and the power consumption of the user terminal can be reduced. In order to better understand the present invention, the present invention is further explained below in detail with reference to the drawings in specific implementation modes.

Embodiment 1

Figure 1:
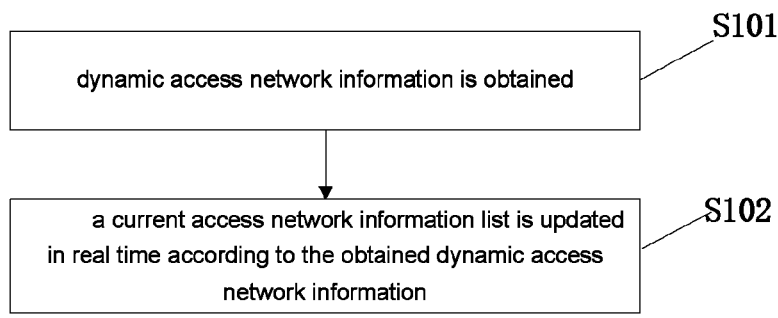
FIG. 1 is a flow diagram of a method for managing access network information according to an embodiment 1 of the present invention.

As shown in FIG. 1, a method for managing access network information provided by the embodiment includes the steps as follows.

Step 101: Dynamic access network information is obtained.

In this step, specifically speaking, the dynamic access network information can be obtained from a user terminal, and/or the dynamic access network information can be obtained from an access network management module. The access network management module in the embodiment includes access points, an access point control network element (for example, an AC in a WLAN), a network management system, an access network element detection system and the like.

Step 102: A current access network information list is updated according to the obtained dynamic access network information.

Wherein, when the dynamic access network information is obtained from the user terminal, the method includes that:

the user terminal obtains access network information by sending an access network information obtaining request containing current position information thereof or the user terminal obtains access network information by self-detection; and the user terminal access an access network according to the currently obtained access network information, generates the dynamic access network information according to a connection result, and sends the dynamic access network information.

The process that the user terminal generates the dynamic access network information according to the connection result includes that:

when the user terminal is successfully connected to a corresponding access point according to the current access network information and can be successfully connected to the internet, the dynamic access network information including connection success information, user terminal position information (which may specifically be position information regarding the connection of the user terminal to the access point or current position information of the user terminal) and access point information is generated, wherein the access point information may include identification information of the access point or may further include a type of the access point and the like; or when the user terminal cannot find the corresponding access point according to the current access network information or cannot access the corresponding access point (probably caused by inputting of a wrong password, limitation of a maximum connection number of access points and the like) or cannot be successfully connected to the internet after being connected to the corresponding access point, the dynamic access network information including connection failure information and access point information is generated, wherein the connection failure information includes a connection failure reason, the information may be the position information regarding the connection of the user terminal to the access point or may be the current position information of the user terminal and the access point information, and the access point information may include the identification information of the access point or may further include the type of the access point and the like.

When the user terminal obtains the dynamic access network information, the process that the current access network information list is updated according to the obtained dynamic access network information includes that:

when it is determined that the user terminal is successfully connected according to connection result information (namely connection success or failure information) included by the obtained dynamic access network information, it is judged whether corresponding access point information exists in the current access network information list, and if NO, the access point information is added to the access network information list; and if YES, any processing may not be carried out, or when it is judged that a current state of the access point in the list is unavailable, it is set to be available, or the priority of the access point is directly adjusted, for example, the priority is set to be higher. When it is determined that the user terminal is unsuccessfully connected according to the obtained dynamic access network information, it is judged whether the corresponding access point information exists in the current access network information list, if NO, any processing may not be carried out, it can be added to the list, and the state is set to be available; and if YES, the access point can be updated according to the connection failure reason of the user terminal in any one of modes as follows.

1. An access failure reason is authenticated via the access network management module, and this process includes that:

an access network information authentication request containing the access point information and position information of the user terminal is sent to the access network management module; and an authentication result obtained by authentication via the access network management module according to the access network information authentication request is received, the authentication result including the connection failure reason obtained by authentication; and it is judged whether the connection failure reason obtained by authentication conforms to a feedback sending failure reason of the user terminal according to the authentication result, and if YES, the access point is updated.

2. The access failure reason is authenticated by feedbacks of other user terminals, and the access point is updated after the dynamic access network information, including the same failure reason, fed back by at least one of the other user terminals is received.

The failure reason in the embodiment includes inexistence of the access point, inability to access the access point, or inability to access the internet in the case of an ability to access the access point.

In the first and second modes, when the access point is updated, any one of the following two updating modes can be specifically adopted.

When the failure reason in the dynamic access network information is that the corresponding access point cannot be found or it cannot access the corresponding access point, the corresponding access point is set to be unavailable;

when the failure reason in the dynamic access network information is that it cannot be successfully connected to the internet after being connected to the corresponding access point, the priority of the access point is re-set, or when the access point is unavailable currently, the access point is set to be available;

or the availability of the access point is calculated by using a pre-set optimization algorithm, when the calculated availability is smaller than a pre-set threshold value, the access point is set to be unavailable, and when the calculated availability is greater than the pre-set threshold value, the access point is set to be available. For example, since each access point has an availability attribute value, a maximum available threshold is modified to 100, a minimum available threshold is modified to 60 (the minimum available threshold is the threshold value mentioned here), when the failure reason in the dynamic access network information is that the corresponding access point cannot be found or it cannot access the corresponding access point, 1 is subtracted from the availability attribute value of the corresponding access point until the availability attribute value is lower than 60, when the availability attribute value is lower than 60, subtraction is no longer carried out on it, and the access point is directly marked to be unavailable; and when the dynamic access network information includes the connection success information, the availability attribute value of the corresponding access point can be directly upgraded to 100, or the availability attribute value is updated according to a set gradient value (for example, the availability attribute value increases each time by 5, 10 or the like until it is upgraded to 100), the availability is greater than the minimum threshold 60, and the access point is set to be available.

It is important to note that in addition to calculation and updating of the availability of the access point in the modes in the embodiment, the priority of the access point can be updated in real time with reference to the current availability, current available bandwidth and current connection number of the access points. Any detailed descriptions are no longer needed here. It can be known, according to the process, that there are available and unavailable access points among access points included in the access network information list. When the access network information is sent to the user terminal, available access point information is sent preferentially. Certainly, only the available access point information is sent, and the available access point information can be arranged in a sequence of priority. Moreover, when being sent to the user terminal, the available access point information can be sent in the sequence of priority. At this time, after receiving the information, the user terminal can be optionally connected to an access point according to the priority of each access point.

The explanations are carried out above by taking obtaining of the dynamic access network information from the user terminal as an example, and the explanations will be carried out below by taking obtaining of the dynamic access network information from the access network management module as an example.

When the dynamic access network information is obtained from the access network management module, the obtained dynamic access network information includes access point information and access point change information of a corresponding access point, the access point change information includes at least one of position change information, identification change information, unavailable identification information and priority change information, and the access point information includes identification information of the access point, or may further include information such as the type of the access point.

At this time, the step that the current access network information list is updated according to the obtained dynamic access network information includes that:

it is judged whether corresponding access point information exists in the current access network information list according to the obtained dynamic access network information, in the case of existence, if the access point information includes the position change information of the access point, position information of the corresponding access point in the access network information list is updated;

if the access point information includes the identification change information of the access point, the identification information of the corresponding access point in the access network information list is updated;

if the access point information includes the unavailable identification information, the corresponding access point in the access network information list is set to be unavailable;

if the access point information includes the priority change information, the priority of the corresponding access point in the access network information list is updated;

and in the case of inexistence, if the access point information includes the unavailable identification information, the corresponding access point is added to the access network information list, the unavailability thereof is recorded, or any processing is not carried out; if the access point information includes the position change information of the access point, the corresponding access point is added to the access network information list, and latest position information thereof is recorded;

if the access point information includes the identification change information of the access point, the corresponding access point is added to the access network information list, and latest identification information thereof is recorded; and if the access point information includes the priority change information, the corresponding access point is added to the access network information list, and latest priority thereof is recorded.

After the current access network information list is updated according to the obtained dynamic access network information, the updated access network information can be sent to the user terminal; specifically speaking, the updated access network information can be actively sent to the corresponding user terminal, which may be a user terminal requesting for the access network information previously and/or a user terminal feeding back the dynamic access network information thereto; and the updated access network information can be passively sent according to the access network information obtaining request of the user terminal. It is important to note that in the embodiment, specifically speaking, only pieces of updated access network information can be sent to the user terminal, and the whole updated access network information list can be sent to the user terminal.

Embodiment 2

Figure 2:
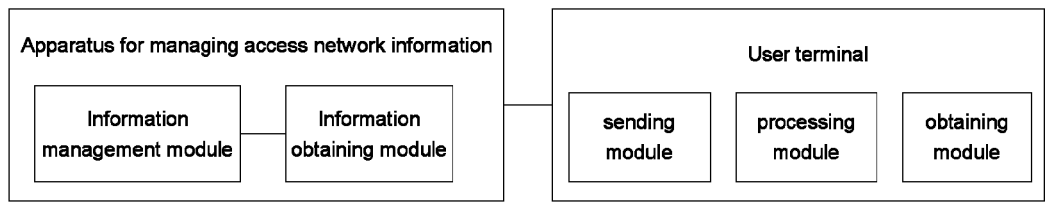
FIG. 2 is a structure diagram 1 of an apparatus for managing access network information according to an embodiment 2 of the present invention.

The embodiment of the present invention provides an apparatus for managing access network information. The apparatus for managing access network information may be an ANDSF unit or other function units. As shown in FIG. 2, the apparatus includes:

an information obtaining module, configured to obtain dynamic access network information, wherein specifically speaking, the dynamic access network information can be obtained from a user terminal, and/or the dynamic access network information can be obtained from an access network management module, and the access network management module in the embodiment includes access points, an access point control network element (for example, an AC in a WLAN), a network management system, an access network element detection system and the like; and an information management module, configured to update a current access network information list according to the obtained dynamic access network information.

Wherein, when the information obtaining module obtains the dynamic access network information from the user terminal, the information obtaining module obtains the dynamic access network information sent by the user terminal, the dynamic access network information being obtained by sending an access network information obtaining request containing current position information thereof from the user terminal or obtained by self-detection; and the user terminal access an access network according to the currently obtained access network information, and the dynamic access network information is generated according to a connection result.

In the embodiment, the user terminal includes an obtaining module, a processing module and a sending module, wherein the obtaining module is configured to obtain access network information by sending the access network information obtaining request containing the current position information of the user terminal or obtain access network information by self-detection;

the processing module is configured to perform connection processing on the access network according to the access network information, and generate the dynamic access network information according to the connection result; and the sending module is configured to send the dynamic access network information.

Wherein, the process that the processing module generates the dynamic access network information according to the connection result includes that:

when the connection result is that current access network information is successfully connected to a corresponding access point and can be successfully connected to the internet, the dynamic access network information including connection success information, user terminal position information (which may specifically be position information regarding the connection of the user terminal to the access point or current position information of the user terminal) and access point information is generated, wherein the access point information may include identification information of the access point or may further include a type of the access point and the like; or when the connection result is that the current access network information cannot find the corresponding access point or cannot access the corresponding access point (probably caused by inputting of a wrong password, limitation of a maximum connection number of access points and the like) or cannot be successfully connected to the internet after being connected to the corresponding access point, the dynamic access network information including connection failure information and access point information is generated, wherein the connection failure information includes a connection failure reason, the information may be the position information regarding the connection of the user terminal to the access point or may be the current position information of the user terminal and the access point information, and the access point information may include the identification information of the access point or may further include the type of the access point and the like. When the information obtaining module obtains the dynamic access network information from the user terminal, the process that the information management module updates the current access network information list according to the obtained dynamic access network information includes that:

when the information management module determines that the user terminal is successfully connected according to connection result information (namely connection success or failure information) included by the obtained dynamic access network information, it is judged whether corresponding access point information exists in the current access network information list, and if NO, the access point information is added to the access network information list; and if YES, any processing may not be carried out, or when it is judged that a current state of the access point in the list is unavailable, it is set to be available, or the priority of the access point is directly adjusted, for example, the priority is set to be higher. When the information management module determines that the user terminal is unsuccessfully connected according to the obtained dynamic access network information, it is judged whether the corresponding access point information exists in the current access network information list, if NO, any processing may not be carried out, it can be added to the list, and the state is set to be available; and if YES, the access point can be updated according to the connection failure reason of the user terminal in any one of modes as follows.

1. An access failure reason is authenticated via the access network management module, and this process includes that:

the information management module sends an access network information authentication request containing the access point information and position information of the user terminal to the access network management module; and the information management module receives an authentication result obtained by authentication via the access network management module according to the access network information authentication request, the authentication result including the connection failure reason obtained by authentication; and it is judged whether the connection failure reason obtained by authentication conforms to a feedback sending failure reason of the user terminal according to the authentication result, and if YES, the access point is updated.

2. The access failure reason is authenticated by feedbacks of other user terminals.

The access point is updated after the information management module receives the dynamic access network information, including the same failure reason, fed back by at least one of the other user terminals.

In the first and second modes, when the information management module updates the access point, any one of the following two updating modes can be specifically adopted.

When the failure reason in the dynamic access network information is that the corresponding access point cannot be found or it cannot access the corresponding access point, the information management module sets the corresponding access point to be unavailable;

when the failure reason in the dynamic access network information is that it cannot be successfully connected to the internet after being connected to the corresponding access point, the information management module re-sets the priority of the access point, or when the access point is unavailable currently, the information management module sets the access point to be available;

or the information management module calculates the availability of the access point by using a pre-set optimization algorithm, when the calculated availability is smaller than a pre-set threshold value, the access point is set to be unavailable, and when the calculated availability is greater than the pre-set threshold value, the access point is set to be available.

It can be known, according to the process, that there are available and unavailable access points among access points included in the access network information list in the embodiment. When the access network information is sent to the user terminal, available access point information is sent preferentially. Certainly, only the available access point information is sent. Moreover, when being sent to the user terminal, the available access point information can be sent in a sequence of priority. At this time, after receiving the information, the user terminal can be optionally connected to an access point according to the priority of each access point.

The explanations are carried out above by taking obtaining of the dynamic access network information from the user terminal by the information obtaining module as an example, and the explanations will be carried out below by taking obtaining of the dynamic access network information from the access network management module by the information obtaining module as an example.

When the information obtaining module obtains the dynamic access network information from the access network management module, the obtained dynamic access network information includes access point information and access point change information of a corresponding access point, the access point change information includes at least one of position change information, identification change information, unavailable identification information and priority change information, and the access point information includes identification information of the access point, or may further include information such as the type of the access point. At this time, the process that the information management module updates the current access network information list according to the obtained dynamic access network information includes that:

the information management module judges whether corresponding access point information exists in the current access network information list according to the obtained dynamic access network information, in the case of existence, if the access point information includes the position change information of the access point, position information of the corresponding access point in the access network information list is updated;

if the access point information includes the identification change information of the access point, the identification information of the corresponding access point in the access network information list is updated;

if the access point information includes the unavailable identification information, the corresponding access point in the access network information list is set to be unavailable;

if the access point information includes the priority change information, the priority of the corresponding access point in the access network information list is updated;

and in the case of inexistence, if the access point information includes the unavailable identification information, the corresponding access point is added to the access network information list, the unavailability thereof is recorded, or any processing is not carried out; if the access point information includes the position change information of the access point, the corresponding access point is added to the access network information list, and latest position information thereof is recorded;

if the access point information includes the identification change information of the access point, the corresponding access point is added to the access network information list, and latest identification information thereof is recorded; and if the access point information includes the priority change information, the corresponding access point is added to the access network information list, and latest priority thereof is recorded.

Figure 3:
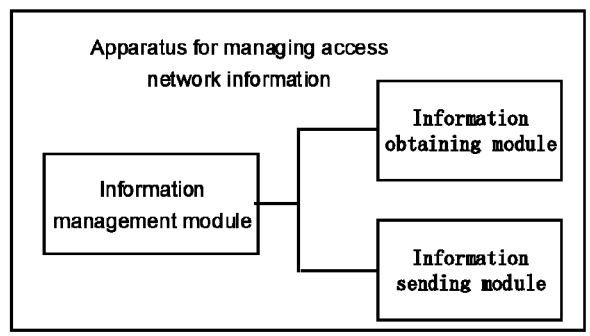
FIG. 3 is a structure diagram 2 of an apparatus for managing access network information according to an embodiment 2 of the present invention.

As shown in FIG. 3, the apparatus for managing access network information in the embodiment may further include an information sending module. The information sending module is configured to send the updated access network information to the user terminal after the current access network information list is updated according to the obtained dynamic access network information when the information obtaining module obtains the dynamic access network information from the user terminal; specifically speaking, the information sending module can actively send the updated access network information to the corresponding user terminal, which may be a user terminal requesting for the access network information previously and/or a user terminal feeding back the dynamic access network information thereto; and the information sending module can also passively send the updated access network information according to the access network information obtaining request of the user terminal. It is important to note that in the embodiment, specifically speaking, only pieces of updated access network information can be sent to the user terminal, and the whole updated access network information list can be sent to the user terminal.

Embodiment 3

In order to better understand the present invention, an agent further explains the present invention below by taking several specific application scenes as an example.

An apparatus for managing access network information shown in FIG. 4 obtains dynamic access network information from a user terminal, and a maintenance process of an access network information list includes the steps as follows.

Step 401: A user terminal sends an access network information request to an apparatus for managing access network information (which may be an ANDSF unit), configured to obtain available access network information, and position information of the user terminal is contained in the request.

Step 402: The apparatus for managing access network information sends an access network information response to the user terminal, the response message containing an available access point list, an access technology type, an access point identifier and the like.

Step 403: The user terminal is connected with a corresponding access point according to the response message, and sends a feedback request to the apparatus for managing access network information according to a connection result, the feedback request including dynamic access network information; and if the access point is successfully connected and can be successfully connected to the internet, the user terminal feeds back a feedback request containing information regarding that the access point can be normally used to the apparatus for managing access network information. The request message carries information such as the position information of the user terminal, the type of the access point, the identifier and the connection result; and if the user terminal discovers inability to access the access point, inexistence of the access point, or inability to access the internet in the case of an ability to access the access point, and the inability to access may be caused by inputting of a wrong password, limitation of a maximum connection number of access points and other factors, the user terminal carries connection failure information in an access network feedback request message, and sends the connection failure information which includes a connection failure reason to the apparatus for managing access network information.

The described process is that the user terminal feeds back the access network information issued by the apparatus for managing access network information on the basis of Step 401 and Step 402. In the embodiment, the user terminal can self-detect the access network information on the basis of no interaction between Step 401 and Step 402, and can access the corresponding access point. Under this situation, the user terminal directly feeds back the detected neighbour access network information to the apparatus for managing access network information. The feedback process is as follows.

If the access point is successfully connected and can be successfully connected to the internet, the user terminal feeds back a feedback request containing information regarding that the access point can be normally used to the apparatus for managing access network information. The request message carries information such as the position information of the user terminal, the type of the access point, the identifier and the connection result; and if the user terminal discovers inability to access the access point, inexistence of the access point, or inability to access the internet in the case of the ability to access the access point, and the inability to access may be caused by inputting of the wrong password, limitation of the maximum connection number of the access points and other factors, the user terminal carries connection failure information in the access network feedback request message, and sends the connection failure information which includes the connection failure reason to the apparatus for managing access network information.

Step 404: The apparatus for managing access network information receives the feedback request from the user terminal, and performs processing according to the information in the feedback request message as follows.

If the access point fed back by the user terminal is successfully connected, the apparatus for managing access network information checks whether the access point information exists in the maintained access network information list. If NO, the access network information (the access network information needs to mark whether the access network is trusted or trustless) is added. If YES, the access network information can be updated to be available, the priority is adjusted according to a certain rule, namely the priority is adjusted to reach a certain level. Moreover, after receiving access network information requests from other user terminals, the apparatus for managing access network information will issue the access network information (the access network information contains information indicating whether the access network is trusted) according to the position of the user terminal.

If the access point fed back by the user terminal is abnormally connected, for example abnormality includes inexistence of the access point, inability to access the access point or inability of successful connection and access such as inability to access the internet in the case of the ability to access the access point, if the access network information stored by the apparatus for managing access network information contains the access point, the apparatus for managing access network information can directly send an access network information authentication request to the access points, the access point control network element (for example, the AC in the WLAN), the network management system, the access network element monitoring system or other access network management modules, and is configured to verify information in the feedback request of the user terminal, judge whether a phenomenon of unsuccessful connection reported by the user terminal is correct, and obtain an unsuccessful connection reason from the relevant network element, wherein a message carries relevant information such as an access network identifier and a UE position.

Step 405: After the access points, the access point control network element (for example, the AC in the WLAN), the network management system, the access network element monitoring system or the other access network management modules receive the access network information authentication request from the apparatus for managing access network information, it is verified whether the access point does not exist, cannot be accessed, or cannot have access to the internet even though the access point can be accessed according to various reasons in the request, namely it is verified whether the connection failure reason conforms to the reason reported by the user terminal, and a corresponding authentication response is returned to the apparatus for managing access network information.

Step 406: The apparatus for managing access network information updates the managed access network information according to an authentication response result.

If the access point cannot be successfully connected to have access to the internet indeed, an access network information management maintenance module of the apparatus for managing access network information can set the access point to be unavailable when maintaining and managing the access network information list. For example, the access point is de-activated, and this type of access point will not be issued in a subsequent access network information issuing process.

If the access point can be normally connected to have access to the internet, the access network information can be updated to be available or can be updated to make the priority reach a certain level.

Step 407: The apparatus for managing access network information sends available access network information at a current position of the user terminal to the user terminal. It is important to note that the user terminal here may be a user terminal feeding back a request to the apparatus for managing access network information or may be a terminal requesting the apparatus for managing access network information for the access network information previously.

Figure 5:
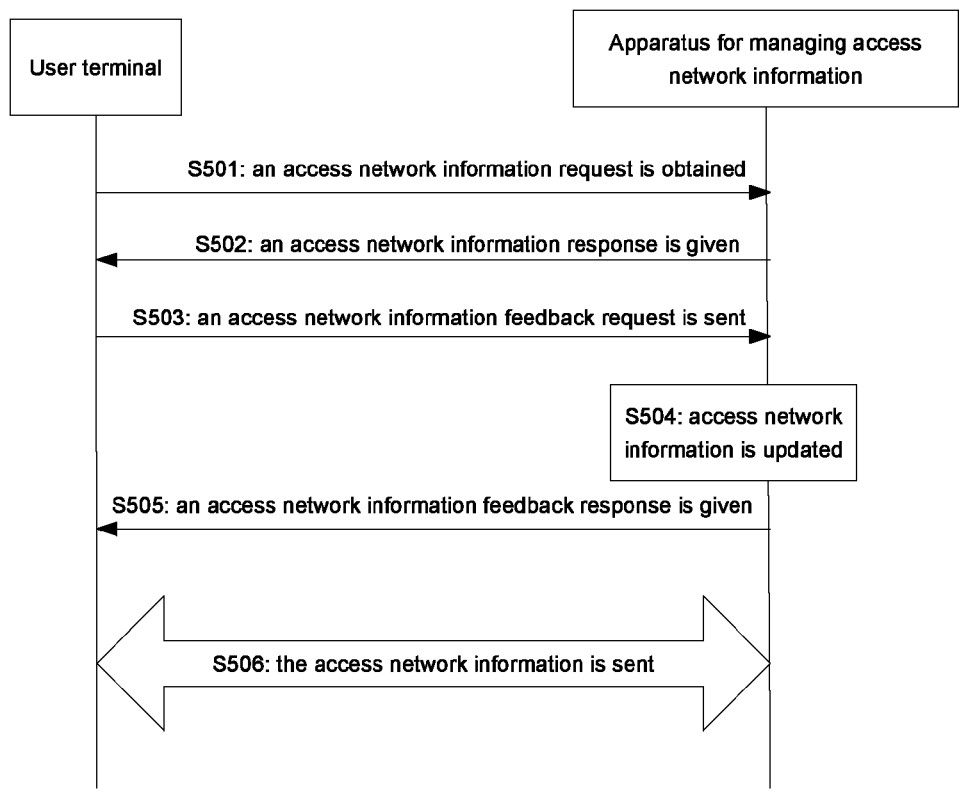
FIG. 5 is a flow diagram of a method for managing access network information based on authentication of a user terminal according to an embodiment 3 of the present invention.

In an access network information management flow shown in FIG. 5, a failure reason reported by a user terminal is authenticated by utilizing access points, an access point control network element (for example, an AC in a WLAN), a network management system, an access network element monitoring system or other access network management modules. As shown in FIG. 5, other authentication modes can be adopted in the embodiment, which include that:

Step 501: The user terminal sends an access network information request to an apparatus for managing access network information (which may be an ANDSF unit), configured to obtain available access network information, and position information of the user terminal is contained in the request.

Step 502: The apparatus for managing access network information sends an access network information response to the user terminal, the response message containing an available access point list, an access technology type, an access point identifier and the like.

Step 503: The user terminal is connected with a corresponding access point according to the response message, and sends a feedback request to the apparatus for managing access network information according to a connection result, the feedback request including dynamic access network information; and if the access point is successfully connected and can be successfully connected to the internet, the user terminal feeds back a feedback request containing information regarding that the access point can be normally used to the apparatus for managing access network information. The request message carries information such as the position information of the user terminal, the type of the access point, the identifier and the connection result; and if the user terminal discovers inability to access the access point, inexistence of the access point, or inability to access the internet in the case of an ability to access the access point, and the inability to access may be caused by inputting of a wrong password, limitation of a maximum connection number of access points and other factors, the user terminal carries connection failure information in an access network feedback request message, and sends the connection failure information which includes a connection failure reason to the apparatus for managing access network information.

The described process is that the user terminal feeds back the access network information issued by the apparatus for managing access network information on the basis of Step 501 and Step 502. In the embodiment, the user terminal can self-detect the access network information on the basis of no interaction between Step 501 and Step 502, and can access the corresponding access point. Under this situation, the user terminal directly feeds back the detected neighbour access network information to the apparatus for managing access network information. The feedback process is as follows.

If the access point is successfully connected and can be successfully connected to the internet, the user terminal feeds back a feedback request containing information regarding that the access point can be normally used to the apparatus for managing access network information. The request message carries information such as the position information of the user terminal, the type of the access point, the identifier and the connection result; and if the user terminal discovers inability to access the access point, inexistence of the access point, or inability to access the internet in the case of the ability to access the access point, and the inability to access may be caused by inputting of the wrong password, limitation of the maximum connection number of the access points and other factors, the user terminal carries connection failure information in the access network feedback request message, and sends the connection failure information which includes the connection failure reason to the apparatus for managing access network information.

Step 504: The apparatus for managing access network information receives the feedback request from the user terminal, and performs processing according to the information in the feedback request message as follows.

If the access point fed back by the user terminal is successfully connected, the apparatus for managing access network information checks whether the access point information exists in the maintained access network information list. If NO, the access network information (the access network information needs to mark whether the access network is trusted or trustless) is added. If YES, the access network information can be updated to be available, the priority is adjusted according to a certain rule, namely the priority is adjusted to reach a certain level. Moreover, after receiving access network information requests from other user terminals, the apparatus for managing access network information will issue the access network information (the access network information contains information indicating whether the access network is trusted) according to the position of the user terminal.

If the access point fed back by the user terminal is abnormally connected, for example abnormality includes inexistence of the access point, inability to access the access point or inability of successful connection and access such as inability to access the internet in the case of the ability to access the access point, if the access network information stored by the apparatus for managing access network information contains the access point, the apparatus for managing access network information marks the access point which is fed back, and performs corresponding judgement after receiving abnormality feedbacks for the same access point from other user terminals subsequently. The specific process is as follows.

When it is possible to receive the same abnormality feedback for the same access point from the other user terminals subsequently, the apparatus for managing access network information can calculate the access point by using a pre-set optimization algorithm on the basis of the sample, and calculate and set the priority of the access point. For example, the access point of which the calculated priority is lowest is directly marked to be unavailable, and the access point will not be issued to the user terminal subsequently; the access point of which the calculated priority is normal can be marked to be available normally, when the access point is issued to the user terminal subsequently, and the access priority of the access point can be carried at the same time to allow the user terminal to select and judge whether to be connected.

The optimization algorithm in the embodiment probably has multiple implementation modes, which are no longer described in detail in the embodiment.

Step 505: The apparatus for managing access network information returns an access network feedback response message to the user terminal, and it is shown that the feedback request sent by the user terminal is successfully processed.

Step 506: The user terminal actively requests the apparatus for managing access network information for the updated access network information, or the apparatus for managing access network information actively pushes the updated access network information to the user terminal.

Figure 4:
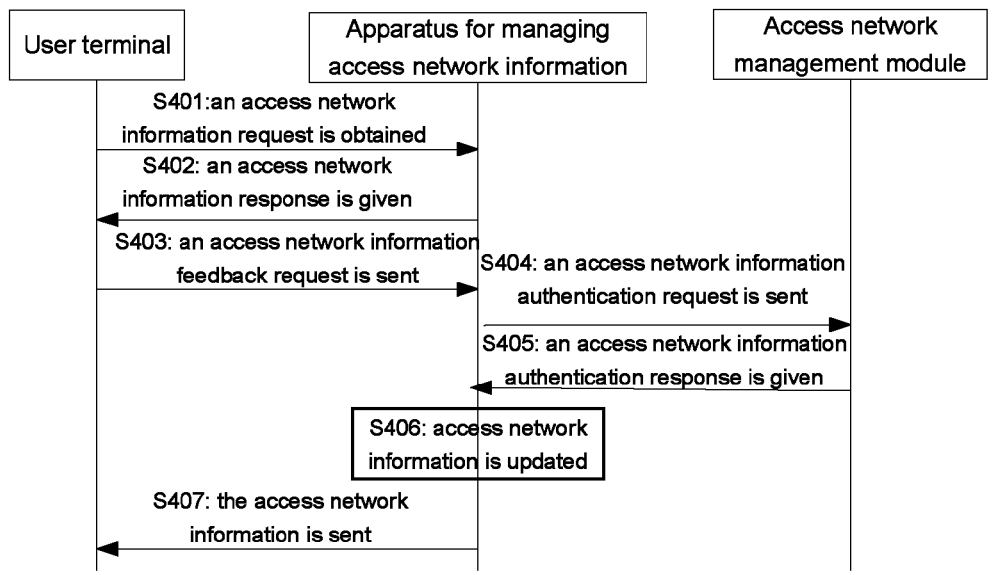
FIG. 4 is a flow diagram of a method for managing access network information based on authentication of an access network management module according to an embodiment 3 of the present invention.
Figure 6:
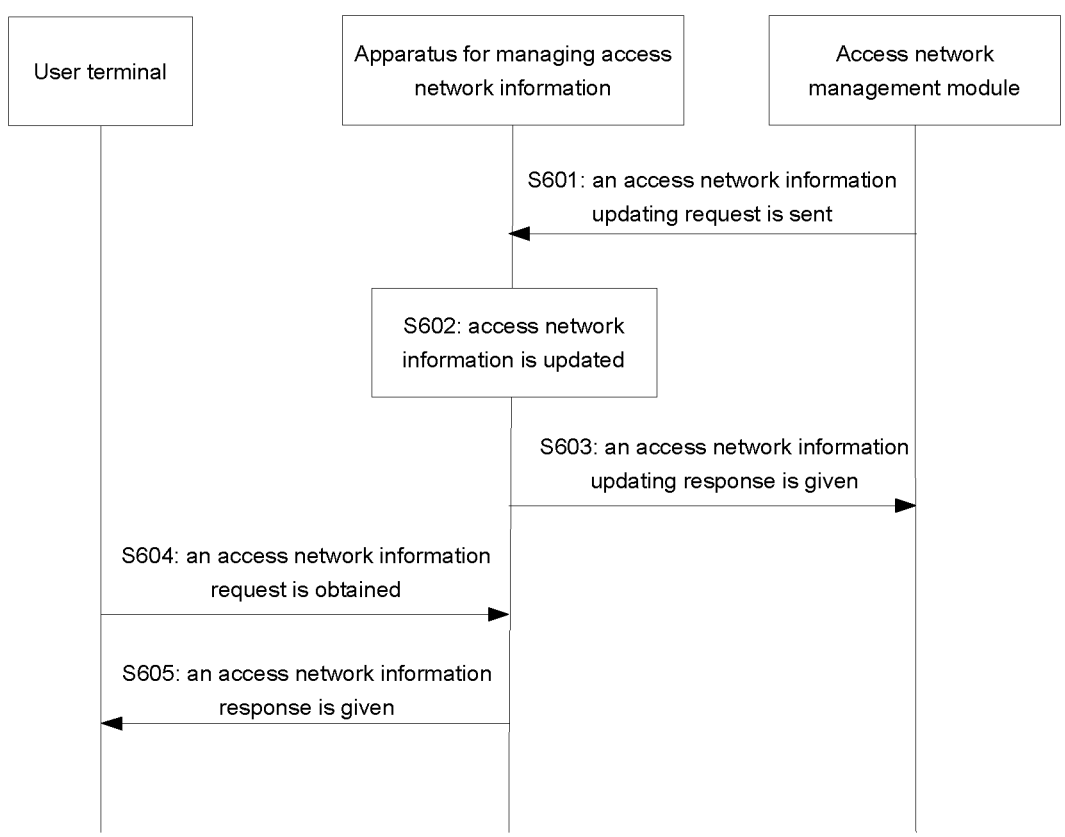
FIG. 6 is a flow diagram 1 of management of access network information based on obtaining of dynamic access network information from an access network management module according to an embodiment 3 of the present invention.

FIG. 4 and FIG. 5 show a process of obtaining a dynamic access network message from the user terminal by the apparatus for managing access network information to maintain an access network information list. A process of obtaining dynamic access network information from the access network management module to maintain the access network information list is explained below. When the access points, the access point control network element (for example, the AC in the WLAN), the network management system, the access network element monitoring system or the other access network management modules discover that the access network information is updated, the apparatus for managing access network information (which may be the ANDSF unit) is actively informed to perform updating. As shown in FIG. 6, the maintenance process includes the steps as follows.

Step 601: After the access points, the access point control network element (for example, the AC in the WLAN), the network management system, the access network element monitoring system or the other access network management modules discover that the access network information is updated, an access network information updating request is actively sent to the apparatus for managing access network information, and the apparatus for managing access network information is informed to update the relevant access network information. The request carries dynamic access network information needing to be updated, which includes, but not limited to, information such as position migration of the access point or change of a domain name identifier, unavailability of the access point due to, for example, over-high load, over-loading of a maximum connection number and inability to access the internet, and change of the priority of the access point.

Step 602: After the apparatus for managing access network information receives the access network information updating request, the access network information list is updated according to the dynamic access network information in the request. The process specifically includes that:

if the access point is unavailable, the access point is set to be unavailable; for example, the access point is de-activated; in a subsequent access network information issuing process, the access point is no longer issued; if the access point migrates or the domain name identifier is changed, the corresponding position management or domain name identifier is updated; and if the priority of the access point is changed, the corresponding priority level is updated.

Step 603: After the apparatus for managing access network information successfully updates the access network information, an access network information updating response is returned to the access network management modules.

Step 604: The user terminal sends an access network information obtaining request to the apparatus for managing access network information, configured to obtain available access network information, the request containing the position information of the user terminal.

Step 605: The apparatus for managing access network information sends a response to the user terminal, a response message containing an available access point list, an access technology type, an access point identifier and the like.

Figure 7:
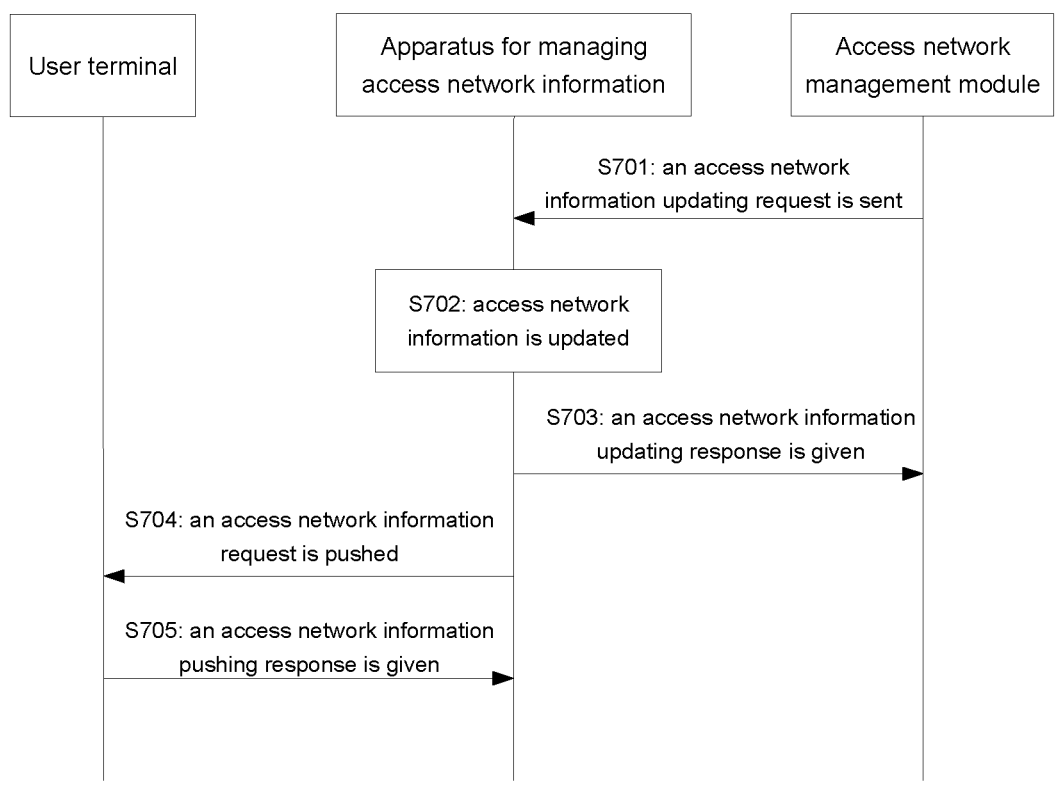
FIG. 7 is a flow diagram 2 of management of access network information based on obtaining of dynamic access network information from an access network management module according to an embodiment 3 of the present invention.

In a process shown in FIG. 6, the apparatus for managing access network information passively sends the updated access network information to the user terminal according to the request of the user terminal, and can actively send the updated access network information. As shown in FIG. 7, the process includes the steps as follows.

Step 701: After access points, an access point control network element (for example, an AC in a WLAN), a network management system, an access network element monitoring system or other access network management modules discover that the access network information is updated, an access network information updating request is actively sent to the apparatus for managing access network information, and the apparatus for managing access network information is informed to update the relevant access network information. The request carries dynamic access network information needing to be updated, which includes, but not limited to, information such as position migration of the access point or change of a domain name identifier, unavailability of the access point due to, for example, over-high load, over-loading of a maximum connection number and inability to access the internet, and change of the priority of the access point.

Step 702: After the apparatus for managing access network information receives the access network information updating request, the access network information list is updated according to the dynamic access network information in the request. The process specifically includes that:

if the access point is unavailable, the access point is set to be unavailable; for example, the access point is de-activated; in a subsequent access network information issuing process, the access point is no longer issued; if the access point migrates or the domain name identifier is changed, the corresponding position management or domain name identifier is updated; and if the priority of the access point is changed, the corresponding priority level is updated.

Step 703: After the apparatus for managing access network information successfully updates the access network information, an access network information updating response is returned to the access network management modules.

Step 704: The apparatus for managing access network information actively pushes the updated access network information to the user terminal which requests for the corresponding access network information previously, and informs these user terminals that the access network information has been changed, a message containing an available access point list, an access technology type, an access point identifier and the like.

Step 705: The user terminal returns an access network information pushing response message to the apparatus for managing access network information.

It can be seen that in the embodiments of the present invention, the dynamic access network information can be obtained in multiple modes, and the current access network information list can be updated in real time according to the obtained dynamic access network information, so as to ensure that the access network information obtained by the user terminal from the access network information list is the latest information updated in real time. During the access of the user terminal according to the information, a process of scanning the access network to determine the current availability information of the network is no longer needed, so that the switching delay can be reduced, the switching efficiency can be improved, and the power consumption of the user terminal can be reduced, thereby improving the satisfaction degree of the user experience.

The above is further detailed descriptions for the present invention with reference to the specific implementation modes, and it cannot be determined that the specific implementations of the present invention are only limited to these descriptions. Multiple simple deductions or replacements can be made by those skilled in the technical field within which the present invention falls without departing from the concept of the present invention. These deductions or replacements shall fall within the protection scope of the present invention.

INDUSTRIAL APPLICABILITY

As above, the method and apparatus for managing access network information provided by the embodiments of the present invention have the beneficial effects as follows. The dynamic access network information can be obtained in multiple modes, and the current access network information list can be updated in real time according to the obtained dynamic access network information, so as to ensure that the access network information obtained by the user terminal from the access network information list is the latest information updated in real time. During the access of the user terminal according to the information, a process of scanning the access network to determine the current availability information of the network is no longer needed, so that the switching delay can be reduced, the switching efficiency can be improved, and the power consumption of the user terminal can be reduced, thereby improving the satisfaction degree of the user experience.

What is claimed is:

1. A method for managing access network information, comprising:

obtaining dynamic access network information; and updating a current access network information list according to the obtained dynamic access network information;

wherein obtaining the dynamic access network information comprises: obtaining the dynamic access network information from a user terminal, and/or obtaining the dynamic access network information from an access network management module;

wherein when obtaining the dynamic access network information comprises obtaining the dynamic access network information from the user terminal, the method comprises:

receiving the dynamic access network information sent by the user terminal, the dynamic access network information being dynamic access network information generated by the user terminal according to a connection result of connection thereof to an access network; and the user terminal connecting to the access network according to access network information obtained by sending an access network information obtaining request containing current position information about the user terminal or according to access network information obtained by self-detection;

wherein the dynamic access network information generated by the user terminal according to the connection result of connection thereof to the access network comprises:

when the connection result is that the user terminal is successfully connected to a corresponding access point and can be successfully connected to the internet, the generated dynamic access network information comprises: connection success information, user terminal position information and access point information; or when the connection result is that the user terminal cannot find the corresponding access point or cannot access the corresponding access point or cannot be successfully connected to the internet after being connected to the corresponding access point, the generated dynamic access network information comprises connection failure information and access point information, and the connection failure information comprises a connection failure reason;

wherein updating the current access network information list according to the obtained dynamic access network information comprises:

when it is determined that the user terminal is successfully connected according to the obtained dynamic access network information, judging whether corresponding access point information exists in the current access network information list, and when the corresponding access point information does not exist in the current access network information list, adding the access point information to the access network information list; and when it is determined that the user terminal fail to connect according to the obtained dynamic access network information, judging whether the corresponding access point information exists in the current access network information list, and when the corresponding access point information exists in the current access network information list, updating the access point according to the connection failure reason of the user terminal;

wherein updating the access point according to the connection failure reason of the user terminal comprises:

sending an access network information authentication request containing the access point information and position information of the user terminal to the access network management module;

receiving an authentication result obtained by authentication via the access network management module according to the access network information authentication request, wherein the authentication result includes the connection failure reason obtained by authentication; judging whether the connection failure reason obtained by authentication conforms to a failure fed back by the user terminal according to the authentication result, and when the failure reasons are conform, updating the access point;

or, updating the access point after receiving dynamic access network information, including the same failure reason, fed back by at least one of other user terminals.

2. The method for managing access network information according to claim 1, wherein updating the access point comprises:

when the failure reason is that the corresponding access point cannot be found or it cannot access the corresponding access point, setting the access point to be unavailable;

when the failure reason is that it cannot be successfully connected to the internet after being connected to the corresponding access point, re-setting the priority of the access point;

or calculating the availability of the access point by using a pre-set optimization algorithm, when the calculated availability is smaller than a pre-set threshold value, setting the access point to be unavailable, and when the calculated availability is greater than the pre-set threshold value, setting the access point to be available.

3. The method for managing access network information according to claim 1, wherein when obtaining the dynamic access network information comprises obtaining the dynamic access network information from the access network management module, the dynamic access network information comprises corresponding access point information and access point change information, the access point change information comprises at least one of position change information, identification change information, unavailable identification information and priority change information.

4. The method for managing access network information according to claim 3, wherein updating the current access network information list according to the obtained dynamic access network information comprises:

judging whether corresponding access point information exists in the current access network information list according to the obtained dynamic access network information, in the case of existence, when the access point information comprises the position change information of the access point, updating position information of the corresponding access point in the access network information list;

when the access point information comprises the identification change information of the access point, updating identification information of the corresponding access point in the access network information list;

when the access point information comprises the unavailable identification information, setting the corresponding access point in the access network information list to be unavailable;

when the access point information comprises the priority change information, updating the priority of the corresponding access point in the access network information list;

and in the case of inexistence,
when the access point information comprises the unavailable identification information, adding the corresponding access point to the access network information list, recording the unavailability thereof, or carrying out no processing; if the access point information comprises the position change information of the access point, adding the corresponding access point to the access network information list, and recording latest position information thereof;
when the access point information comprises the identification change information of the access point, adding the corresponding access point to the access network information list, and recording latest identification information thereof; and
when the access point information comprises the priority change information, adding the corresponding access point to the access network information list, and recording latest priority thereof.

5. The method for managing access network information according to claim 1, wherein after the current access network information list is updated according to the obtained dynamic access network information, the method further comprises:
sending the updated access network information to the user terminal according to an access network information obtaining request of the user terminal; or actively sending the updated access network information to the corresponding user terminal.

6. An apparatus for managing access network information that performs:
obtaining dynamic access network information; and
updating a current access network information list according to the obtained dynamic access network information;
wherein obtaining the dynamic access network information comprises: obtaining the dynamic access network information from a user terminal, and/or obtaining the dynamic access network information from an access network management module;
wherein when the dynamic access network information is obtained from the user terminal, the dynamic access network information is dynamic access network information generated by the user terminal according to a connection result of connection thereof to an access network; and the user terminal access the access network according to access network information obtained by sending an access network information obtaining request containing current position information or according to access network information obtained by self-detection;
wherein updating the current access network information list according to the obtained dynamic access network information comprises:
when it is determined that the user terminal is successfully connected according to the obtained dynamic access network information, judging whether corresponding access point information exists in the current access network information list, and when the corresponding access point information does not exist in the current access network information list, adding the access point information to the access network information list; and
when it is determined that the user terminal is unsuccessfully connected according to the obtained dynamic access network information, judging whether the corresponding access point information exists in the current access network information list, and when the corresponding access point information not exists in the current access network information list, updating the access point according to the connection failure reason of the user terminal;
wherein updating the access point according to the connection failure reason of the user terminal comprises:
sending an access network information authentication request containing the access point information and position information of the user terminal to the access network management module;
receiving an authentication result obtained by authentication via the access network management module according to the access network information authentication request, wherein the authentication result includes the connection failure reason obtained by authentication; judging whether the connection failure reason obtained by authentication conforms to a failure reason fed back by the user terminal according to the authentication result, and the failure reasons are conform, updating the access point;
or,
updating the access point after receiving the dynamic access network information, including the same failure reason, fed back by at least one of other user terminals.

7. The apparatus for managing access network information according to claim 6, wherein updating the access point comprises:
when the failure reason is that the corresponding access point cannot be found or it cannot access the corresponding access point, setting the access point to be unavailable; when the failure reason is that it cannot be successfully connected to the internet after being connected to the corresponding access point, re-setting the priority of the access point, or when the access point is unavailable currently, setting the access point to be available; or,
calculating the availability of the access point by using a pre-set optimization algorithm, setting the access point to be unavailable when the calculated availability is smaller than a pre-set threshold value, and setting the access point to be available when the calculated availability is greater than the pre-set threshold value.

8. The apparatus for managing access network information according to claim 6, wherein when the information obtaining module obtains the dynamic access network information from the access network management module, the dynamic access network information comprises corresponding access point information and access point change information, the access point change information including at least one of position change information, identification change information, unavailable identification information and priority change information.

9. The apparatus for managing access network information according to claim 8, wherein updating the current access network information list according to the obtained dynamic access network information comprises:
judging whether corresponding access point information exists in the current access network information list according to the obtained dynamic access network information, in the case of existence,
when the access point information comprises the position change information of the access point, updating position information of the corresponding access point in the access network information list;
when the access point information comprises the identification change information of the access point, updating identification information of the corresponding access point in the access network information list;

when the access point information comprises the unavailable identification information, setting the corresponding access point in the access network information list to be unavailable;

when the access point information comprises the priority change information, updating the priority of the corresponding access point in the access network information list;

and in the case of inexistence, when the access point information comprises the unavailable identification information, adding the corresponding access point to the access network information list, recording the unavailability thereof, or carrying out no processing; if the access point information comprises the position change information of the access point, adding the corresponding access point to the access network information list, and recording latest position information thereof;

when the access point information comprises the identification change information of the access point, adding the corresponding access point to the access network information list, and recording latest identification information thereof; and when the access point information comprises the priority change information, adding the corresponding access point to the access network information list, and recording latest priority thereof.

\* \* \* \* \*